Figure 1:
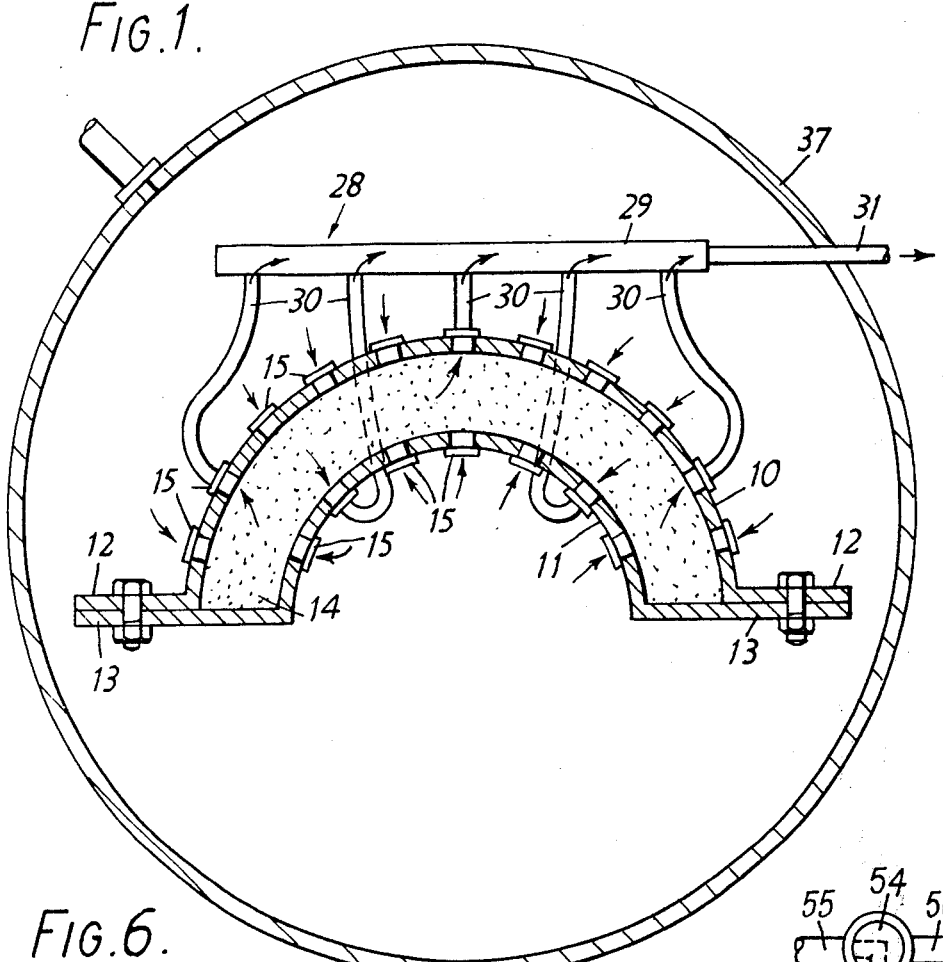

United States Patent [19]
Cotterell

[11] 3,941,528
[45] *Mar. 2, 1976

[54] APPARATUS FOR MOULDING HEAT-EXPANDABLE THERMO-PLASTICS MATERIAL

[76] Inventor: Robert Frederick Joseph Cotterell, Caplan House, Barchester St., London E. 14, England

[*] Notice: The portion of the term of this patent subsequent to May 7, 1991, has been disclaimed.

[22] Filed: Jan. 30, 1974

[21] Appl. No.: 438,030

Related U.S. Application Data

[60] Division of Ser. No. 198,766, Nov. 15, 1971, Pat. No. 3,809,735, which is a continuation-in-part of Ser. No. 860,760, Sept. 24, 1969, abandoned.

[30] Foreign Application Priority Data

Sept. 26, 1968 United Kingdom............... 45717/68
June 5, 1969 United Kingdom............... 28474/69

[52] U.S. Cl................. 425/4 R; 299/141; 264/51; 264/102; 425/812; 425/817 R
[51] Int. Cl.² ........................................ B29D 27/00
[58] Field of Search................... 264/51, 53, 102; 425/DIG. 812, 4 R, 817 R, 387, 388, 420, DIG. 60, 401; 249/141; 164/359

[56] References Cited
UNITED STATES PATENTS

| | | | |
|---|---|---|---|
| 2,354,433 | 7/1944 | Carter | 264/101 X |
| 2,707,802 | 5/1955 | Gard | 249/141 X |
| 2,765,494 | 10/1956 | Weingart | 425/812 X |
| 3,377,662 | 4/1968 | Fukushima | 425/812 X |
| 3,555,620 | 1/1971 | Bucy | 425/812 X |
| 3,737,266 | 6/1973 | Yamamoto | 425/812 X |
| 3,803,277 | 4/1974 | Bassett | 425/4 R X |
| 3,803,281 | 4/1974 | Fix | 264/102 |

FOREIGN PATENTS OR APPLICATIONS

| | | | |
|---|---|---|---|
| 431,925 | 9/1967 | Switzerland | 425/4 R |
| 1,016,124 | 1/1966 | United Kingdom | 425/812 |

Primary Examiner—R. Spencer Annear
Assistant Examiner—Mark Rosenbaum

[57] ABSTRACT

Heat-expandable beads of thermo-plastic material such as polystyrene are moulded by steam heating in a metal mould and venting the interior of the mould through apertures in plugs set into ports in the wall of the mould. The plugs are made of low heat conductivity material, for example nylon, to prevent the apertures being blocked by fusion of the beads in contact with the plugs due to heat conduction from the wall of the mould. The steam may be introduced into the mould through apertures in nylon plugs set in ports in the wall of the mould, the low heat conductivity of the nylon preventing the steam raising the plugs to a temperature at which the beads would burn onto the plugs. The same plugs may be used to introduce steam into the mould and then vent the interior of the mould.

9 Claims, 6 Drawing Figures

APPARATUS FOR MOULDING HEAT-EXPANDABLE THERMO-PLASTICS MATERIAL

This application is a division of my copending application Ser. No. 198,766, filed Nov. 15, 1971, now U.S. Pat. No. 3,809,735, which was, in turn, a continuation-in-part of my copending application Ser. No. 860,760, filed Sept. 24, 1969, now abandoned.

This invention relates to the moulding of heat-expandable thermoplastic material, for example expandable polystyrene.

Expandable polystyrene is produced by incorporating pentane or other volatile hydrocarbon blowing agent into beads of polystyrene. When such beads are heated, the pressure of the blowing agent confined within the beads is increased and the polystyrene softens, so that the beads expand. The degree of expansion and therefore the density is governed by the temperature and duration of heating. The expandable beads of polystyrene are moulded by first pre-expanding the beads to the required density of the finished article, completely filling a mould with the beads, closing the mould, and then heating the beads within the mould. The heat increases the pressure of the gases within the beads and softens the material so that the beads expand to fill the voids between them and fuse together to form a cellular structure. The mould can conveniently be heated by placing it in an autoclave and then introducing steam into the autoclave, the wall of the mould having apertures for the passage of steam from the autoclave into the interior of the mould. Special automatic opening and closing moulding machines are generally provided for large scale manufacture, the formers of the mould being mounted on jaws which incorporate steam chests, each former serving as one wall of a steam chest and having apertures for passage of steam from the steam chest into the mould when closed.

The moulds at present in general use with expandable thermo-plastic material are made of aluminium alloy, since this metal is excellent for casting into shapes and has good thermal conductivity. Steam heating of such moulds has however the disadvantage that it tends to produce articles which have a fused outer crust and a centre of unfused beads, and such articles have poor structural properties. This is particularly the case with articles which have a relatively thick section, for example three inches or more thick. It is believed that the steam in contact with the outside surface of the walls of the mould heats up the walls which in turn heat the beads in the peripheral areas of the mould, and the expansion and fusion of the beads in the peripheral areas forms a barrier which prevents further entry of steam through the apertures in the mould walls and also traps air, gas and condensate in the central areas of the mould.

The object of the invention is to provide moulding apparatus in which air, gas and condensate in the mould are free to escape from the mould until after the beads in the central areas of the mould have fused.

According to the present invention there is provided in apparatus for moulding articles from heat-expandable beads of synthetic thermoplastic polymeric resinous material such as polystyrene, which apparatus is of the type comprising a mould having metal walls formed with inlet apertures therein, the internal surfaces of the mould defining a cavity in which beads can be confined, the cavity conforming to the shape of the article, means defining a chamber surrounding said mould, means for introducing a hot gaseous medium under pressure into said chamber and thereby apply the hot gaseous medium to the outside surfaces of the mould walls, and means for venting the cavity in the mould so that the hot gaseous medium in the chamber flows through said inlet apertures and into said cavity to expand and fuse the beads therein, means for preventing beads in the interior of the moulded article from being unfused, comprising:

plugs in the mould walls that define outlet apertures through which heated gaseous medium is vented out of the cavity, said plugs a. having inner surfaces which surround said outlet apertures and co-operate with the internal surfaces of the metal mould walls in defining the cavity b. being of nonmetallic material adapted to withstand the temperatures and pressures arising in the moulding of an article in thermoplastic material using steam at 20 pounds per square inch as the heated gaseous medium and having a thermal conductivity substantially lower than that of the metal of the mould wall, so that said plugs do not conduct sufficient heat from the metal walls to beads adjacent to said outlet apertures to fuse said beads, thus insuring that gaseous medium can readily pass out of the cavity until beads at the interior of the mould have fused.

The plugs can conveniently be made of plastics material. The thermal conductivity of many suitable plastics material, for example nylon and polytetrafluoroethylene, have a co-efficient of thermal conductivity within the range $2-8 \times 10^{-4}$ cal./sec./sq.cm./1(°C/cm.) as measured by the C177 ASTM Test Method (see Modern Plastics Encyclopaedia Volume 47/No.10A 1970–1971). This range of co-efficients of thermal conductivity is very small compared to that for Aluminium which is approximately $4920 \times 10^{-4}$ cal./sec./sq.cm./1(°C/cm.).

In the operation of the apparatus of the invention the apertures in the plugs remain open until after the gaseous medium has passed through the mould and fused the beads in contact with the plugs. The flow of the hot gaseous medium through the mould expands and fuses the beads in the centre of the mould before exhausting through the apertures in the plugs, together with air, gas, and moisture displaced from the mould by expansion of the beads. The resultant article has a substantially more even density with better structural properties than could be obtained with the previously practised method of steam heating. This in turn enables a much denser product to be produced than was previously possible for a given thickness of section.

The gaseous medium may be hot air, but is preferably steam at a pressure of, for example, 14–20 lbs. per square inch, and the interior of the mould may be vented to atmosphere or to a region at sub-atmospheric pressure.

Hitherto, the inlet apertures in moulds for expandable thermoplastic material have been formed by axial bores or slots in metal plugs set in ports in the mould walls. Such plugs are generally formed of aluminium alloy, approximately half an inch in diameter, and spaced apart at two inch centres, the plug being formed with several narrow slots for passage of steam. When a mould fitted with such inlet plugs is vented through plugs of low heat conductivity material in accordance with the present invention, for example by placing the mould in a steam autoclave and connecting the vent plugs to an exhaust manifold system leading outside the autoclave to atmosphere, the flow of steam through the inlet apertures prevents immediate fusion of the beads adjacent these apertures for a time long enough for the steam to heat the beads in the centre of the mould. After the inlet apertures are sealed by expansion and fusion of the beads at the walls of the mould, the beads at the centre of the mould continue to expand due to the heat of the steam within the mould, and the air, gas, condensate and steam displaced by expansion of the beads are expelled to atmosphere through the vent plugs. The apertures in the vent plugs remain open for a short time after closure of the apertures in the inlet plugs since there is little or no heat conduction from the walls of the mould to the beads in contact with the vent plugs, in accordance with the teaching of the invention.

It has however also been discovered that appreciable advantages are obtained if the hot gaseous medium is introduced into the mould through apertures in plugs of low heat conductivity material set into the wall of the mould and forming part of the internal surface of the mould. The inlet apertures do not then become blocked due to "burning on" of the thermoplastic material, as occurs with metal inlet plugs, so that there is no time wasted in cleaning the plugs between moulding operations. Also, the low heat conductivity inlet plugs do not leave burn marks or impressions on the finished article, and the article is easier to release from the mould walls than with moulds having metal inlet plugs. This results in a shorter time for the moulding operation.

The inlet plugs, like the vent plugs, are preferably formed of nylon, but may be of any suitable material capable of withstanding the temperature and pressure of the gaseous medium without degradation and having a low enough co-efficient of thermal conductivity to ensure that the inside surfaces of the plugs do not reach a temperature sufficient to burn the thermoplastic material in contact with the plugs prior to fusion of the beads in the centre of the mould due to introduction of the hot gaseous medium into the mould.

The venting of the mould in accordance with the invention may take place immediately after introduction of the gaseous medium into the mould, and the same plugs of low heat conductivity may thus be used both for the introduction of the gaseous medium into the mould and for subsequent venting of the mould. This method is particularly applicable to automatic moulding machines in which the steam chests supplying steam to the inlet apertures in the walls of the mould are of relatively small capacity and can be quickly vented.

Figure 6:
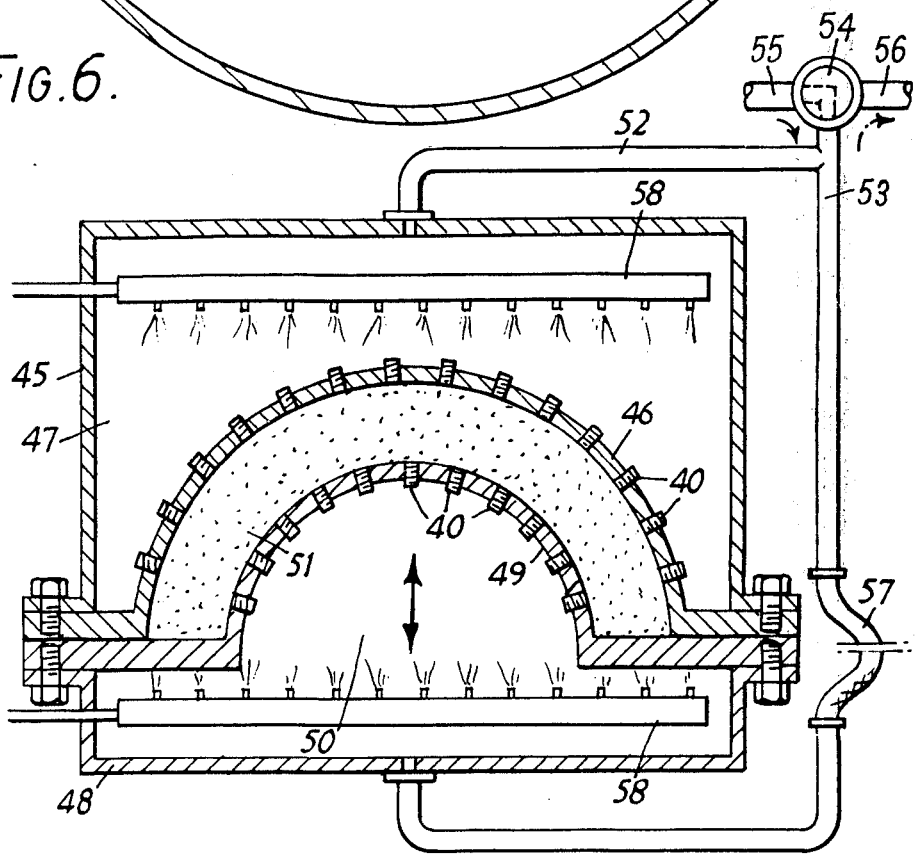
Figure 3:
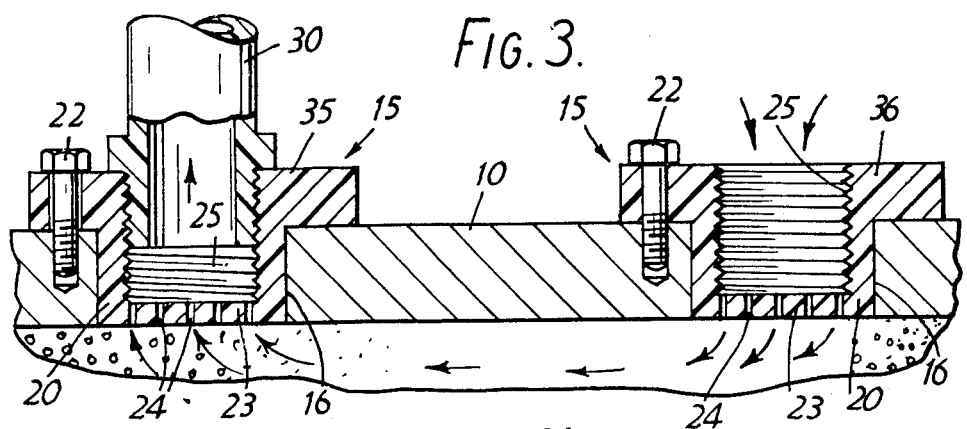
Figure 2:
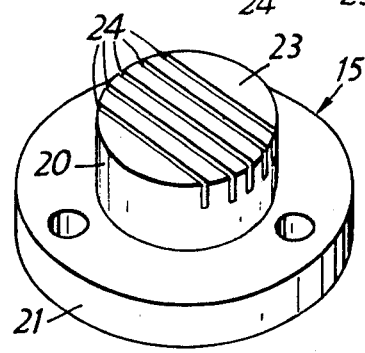
Figure 5:
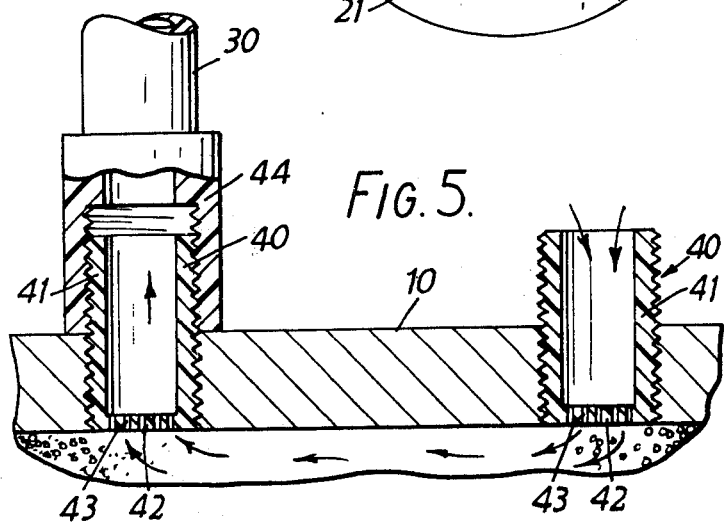
Figure 4:
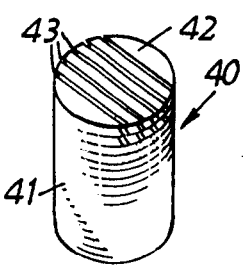

Embodiments of the invention will now be described, by way of example, with reference to the accompanying drawings, in which:

FIG. 1 is a sectional view of a mould mounted in a steam autoclave and vented to atmosphere by a manifold system, FIG. 2 is a perspective view of one of the plugs fitted in the wall of the mould of FIG. 1, FIG. 3 is a fragmentary view of part of a wall of the mould fitted with two of the plugs shown in FIG. 2, one plug permitting passage of steam into the mould and the other plug connected to the manifold system, FIG. 4 is a perspective view of another construction of plug adapted to serve either as an inlet or a vent, FIG. 5 is a fragmentary view of part of a wall of a mould fitted with two of the plugs shown in FIG. 4, one plug serving as an inlet plug and the other plug connected to a manifold system to serve as a vent plug, and FIG. 6 is a sectional view of an automatic moulding machine adapted to carry out the method of the invention.

The mould shown in FIG. 1 comprises upper and lower formers 10, 11 having side flanges 12, 13 respectively which are bolted together to define between the formers a space 14 corresponding to the dimensions of an article to be moulded in expandable polystyrene by the method of the invention. The two formers have end walls (not shown) which co-operate to close the ends of the mould. The formers are made of aluminium alloy, and nylon plugs 15 are set in ports 16 in the walls of the formers.

The plugs 15 are all identical in construction and, as shown in FIGS. 2 and 3, each plug comprises a cylindrical tube 20, approximately 1¼ inches in diameter, which is a force fit in its port 16, the outer end of the tube having a collar 21 which engages against the outside wall of the former surrounding the port. The collar 21 is provided with apertures for screws 22 securing the plug to the former. The inner end of the cylindrical tube 20 is closed by an end wall 23 which is flush with the inside wall of the former, this end wall 23 having several parallel slots 24 for passage of fluid through the plug. The plugs are distributed evenly over the walls of the formers and spaced approximately 7 inches apart. The plugs are made of nylon of the grade marketed under the trade name "Nylon 66" by Combined Insulations and Plastics Ltd of London, but any other grade of nylon or any other material which has a comparable low co-efficient of thermal conductivity and which can withstand the temperature and pressure of steam used in the moulding operation would be suitable. The inside wall of the tube 20 is provided with a screw thread 25.

An exhaust manifold system 28 is connected to a selected number of the plugs 15, the selected plugs being spaced evenly over the walls of the formers. The manifold system comprises a common manifold tube 29, individual pipes 30 leading from the tube 29 and connected one to each of the selected plugs, and an exhaust pipe 31 leading from the manifold tube 29. The pipes 30 are formed with external screw threads which are screwed into the screw threads 25 on the selected plugs, as shown in FIG. 3. The selection of the plugs to be connected to the manifold system will depend on the shape and thickness of the article to be moulded, but in practice it has been found that satisfactory results are obtained if one in 12 of the plugs are connected to the manifold system. It may however be necessary to connect a larger number of plugs to the manifold system at parts of the mould having abrupt changes in shape or thickness. For convenience, the plugs connected to the manifold system will hereinafter be referred to as the vent plugs 35, and the other plugs will be referred to as the inlet plugs 36.

In operation, the mould is assembled with the two formers bolted together and the space between the formers is then packed with beads of expandable polystyrene which have been pre-expanded to the required density. The mould is then placed in an autoclave 37, as shown in FIG. 1 with the exhaust pipe 31 of the manifold system extending through an opening in the wall of the autoclave and open to atmosphere. The autoclave is then closed and steam at 14–20 pounds per square inch introduced into the autoclave. The steam in the autoclave flows into the mould through the inlet plugs 36 and heats up the beads in the mould, and air, gas, condensate and steam exhausts to atmosphere through the vent plugs 35 and the manifold system. The manifold system may be connected to a region of sub-atmospheric pressure to increase the rate of flow of steam into the mould.

The steam in the autoclave heats up the walls of the mould which conduct heat to the beads in the peripheral area of the mould. The beads in contact with the plugs however receive very little heat by conduction from the walls of the mould due to the low heat conductivity of the plugs. The slots 24 in the vent plugs 35 thus remain open until the beads adjacent these plugs are fused by heat from steam within the mould. This steam also heats the beads in the interior of the mould which thus expand and fuse at approximately the same time as the beads in contact with the vent plugs. The continual passage of steam through the inlet plugs 36 prevents immediate fusion of the beads adjacent these plugs for a time long enough to complete the process of expansion and fusion. Also, due to the low heat conductivity of the plugs, the temperature of the inlet plugs does not rise to a value which would cause burning of the polystyrene in contact with the plugs before the moulding operation is completed.

FIGS. 4 and 5 illustrate another construction of plug marked. 40 which can be used either for introducing steam into the mould or for venting the interior of the mould. The plug 40 comprises a cylindrical tube 41, approximately three-fourths inch in diameter, open at one end and having an end wall 42 extending across the other end, the wall 42 having several parallel slots 43 for passage of fluid through the plug. The external wall of the plug is screw threaded, and the plug is screwed into a screw threaded port in the wall of the mould with the end wall 42 flush with the internal wall of the mould. The plugs 40 can conveniently be spaced three inches apart throughout the wall of the mould, and selected plugs can be connected to the pipes 30 of the manifold system by internally screwed sleeves 44 screwed on the outer ends of the plugs and onto the ends of the pipes 30, as shown in FIG. 5. The plugs 40 are preferable made of a material which, in addition to having the necessary low co-efficient of thermal conductivity, is also resilient so that the screw threads on the plug conform to the screw thread on the port in the mould wall to provide a substantially fluid tight seal. Nylon 66, referred to above, is a suitable material.

The automatic moulding machine shown in FIG. 6 comprises a fixed jaw 45 fitted with a mould former 46 which co-operates with the jaw 45 to define a steam chest 47, and a movable jaw 48 fitted with another mould former 49 which co-operates with the jaw 48 to define a steam chest 50. The jaw 48 is movable between a closed position, shown in FIG. 6, in which the formers enclose a space 51 corresponding to the dimensions of an article to be moulded, and an open position in which a moulded article can be withdrawn from between the formers 46, 49. The two steam chests 47, 50 are connected by pipes 52, 53 to a common two-way valve 54 adapted to connect the pipes simultaneously to either a steam supply pipe 55 or to a pipe 56 open to atmosphere. The pipe 53 has a flexible section 57 to permit movement of the jaw 48. Each steam chest is fitted with a water spray device 58 arranged to spray cooling water on the mould formers. Each former 46, 49 is provided with ports each fitted with a nylon plug 40 as shown in FIG. 4, the plugs being arranged with their end walls 42 flush with the wall of the former constituting the inside wall of the mould. All the plugs 40 are open to the associated steam chest.

In operation, the jaws of the machine are closed and the space between the formers is packed with beads of expandable polystyrene which have been pre-expanded to the required bulk density. The beads are supplied through openings in the formers, in known manner. Steam is then supplied simultaneously to the steam chests 47, 50 through the common valve 54, and the steam passes into the mould through the plugs 40. After a short period of time to allow the steam to expand the beads in the centre of the mould, the steam chests are connected to atmosphere through the valve 54. Due to the expansion of the beads and the presence of steam within the mould, the interior of the mould is at a higher pressure than atmosphere, and air, gas, condensate and steam are forced outwards through the plugs 40 into the steam chest and out to atmosphere through the valve 54. The formers 46, 49 are then cooled by the spray devices 57 before lowering the jaw 48 to remove the moulded article.

The period of time required to heat the beads in the mould is dependent upon the size and shape of the mould and can only be determined by trial and error. Irrespective of the time required however, the low heat conductivity material of the plugs ensure that the beads in contact with the plugs are not fused due to heat conduction from the walls of the mould and the plugs remain open until air, gas and condensate have been vented from the mould.

I claim:

1. Apparatus for moulding relatively thick articles from heat expandable beads of synthetic thermoplastic resinous material such as polystyrene, said apparatus comprising a mould having metal walls which define a cavity wherein beads can be confined and the cavity surfaces of which correspond to the shape of an article to be moulded, means cooperating with the walls of the mould to define a chamber external to said cavity, means for introducing a hot gaseous medium under pressure into said chamber so that the medium is applied to the walls of the mould for heating the same, and means for conducting hot gaseous medium from said chamber through the mould walls and into the cavity for expanding and fusing beads therein, said apparatus being characterized by means for assuring good fusion of beads within the interior of articles moulded in the apparatus notwithstanding that such articles may have substantial thickness and, when finished, may have a substantially hard external crust, the last mentioned means comprising:

means for assuring continued venting of hot gaseous medium out of the cavity to enable continued flow of hot gaseous medium from said chamber into the cavity, comprising a plug set into a metal wall of the mould, said plug
  1. having an inner surface defining part of the cavity surface of the mould,
  2. having an aperture therethrough which is surrounded by said inner surface and through which fluid can pass out of the cavity, and
  3. being made of a nonmetallic material capable of withstanding a pressure of 20 p.s.i. under a temperature equal to that of steam at said pressure, and having a coefficient of thermal conductivity substantially lower than that of the metal of the mould wall to ensure that beads in contact with said plug are not fused due to heat conduction therethrough prior to fusion of beads in the center of the cavity.

2. The apparatus of claim 1 wherein said means for conducting hot gaseous medium from said chamber into the cavity comprises another plug set into a metal wall of the mould and having the characterizing features of the first mentioned plug.

3. The apparatus of claim 1, wherein said plug is made of a synthetic polymeric resinous material having a co-efficient of thermal conductivity within the range $2-8 \times 10^{-4}$ cal./sec./sq.cm./1(°C/cm.).

4. The apparatus of claim 3 wherein said plug is made of nylon.

5. Apparatus for moulding articles from heat expandable beads of synthetic thermoplastic polymeric resinous material, which apparatus is of the type comprising a mould having metal walls formed with internal surfaces defining a cavity that conforms to the shape of an article to be moulded and in which beads can be confined, means cooperating with said mould to define a chamber that substantially surrounds the mould and is communicable with the cavity through inlet apertures in the mould walls, means for introducing a hot gaseous medium into said chamber under pressure so that the mould walls can thereby be heated from their outer surfaces, and means for venting the cavity so that gaseous medium can be circulated therethrough from said chamber, by way of said inlet apertures, and in passing through the cavity can expand and fuse beads confined therein, said apparatus being characterized by means for assuring good fusion of beads within the interior of articles moulded in the cavity notwithstanding that such articles may have substantial thickness and, when finished, may have a substantially hard external crust, the last mentioned means comprising:

plugs in the mould walls that define outlet apertures through which the cavity is communicated with said means for venting the same, said plugs
    a. having inner surfaces which surround said outlet apertures and cooperate with the internal surfaces of the metal mould walls in defining the cavity, and
    b. being of nonmetallic material capable of withstandng pressures up to at least 20 pounds per square inch under a temperature equal to that of steam at said pressure, and having a thermal conductivity substantially lower than that of the metal of the mould walls, and on the order of that of nylon, so that said plugs do not conduct sufficient heat from the metal walls to beads adjacent to said outlet apertures to fuse said beads, thus ensuring that gaseous medium can continue to pass out of the cavity until beads at the interior of the mould have fused.

6. The apparatus of claim 5, further characterized in that said inlet apertures are formed in inlet plugs set into the metal walls of the mould, said inlet plugs being of a nonmetallic material capable of withstanding a pressure of at least 20 p.s.i. under a temperature equal to that of steam at said pressure and having a coefficient of thermal conductivity substantially lower than that of the metal of the mould walls to ensure that beads do not "burn on" to said inlet plugs and block said inlet apertures.

7. The apparatus of claim 5, wherein said venting means includes exhaust duct means connected to said plugs and extending to the outside of said chamber, further characterised by:
    A. each of said plugs comprising:
        1. a tubular portion set into a port in a wall of the mould and open at one end, the tubular portion projecting beyond the outer surface of the metal wall of the mould at said end thereof,
        2. an apertured end wall extending across the other end of that tubular portion and lying substantially flush with the interior surface of the mould wall; and
    B. screw threaded means connecting the tubular portion of the plug, at the first mentioned end thereof, with the exhaust duct means.

8. The apparatus of claim 7 further characterised by: each of said plugs:
    1. being made of plastic material having substantial resilience, and
    2. having its tubular portion screwed into the wall of the mould, the resilience of the plug insuring a fluid tight fit between it and the wall of the mould.

9. The apparatus of claim 5, wherein said plugs are made of nylon.

\* \* \* \* \*